United States Patent [19]

Ozawa et al.

[11] Patent Number: 5,526,042
[45] Date of Patent: Jun. 11, 1996

[54] APPARATUS AND METHOD FOR DISPLAYING DIFFERENT TIME-SCALE WAVEFORMS OF A SIGNAL

[75] Inventors: Kentaro Ozawa; Haruhisa Egami, both of Kanagawa-ken, Japan

[73] Assignee: Leader Electronics Corp., Kanagawa-ken, Japan

[21] Appl. No.: 305,701

[22] Filed: Sep. 14, 1994

[30] Foreign Application Priority Data

Sep. 14, 1993 [JP] Japan .................................. 5-229022

[51] Int. Cl.$^6$ ......................... H04N 17/00; H04N 17/02
[52] U.S. Cl. ............................................. 348/185; 348/184
[58] Field of Search ......................... 348/185, 186, 348/184, 564, 561; 324/121 R; 345/134; H04N 17/00, 17/02

[56] References Cited

U.S. PATENT DOCUMENTS

| | | | |
|---|---|---|---|
| 4,149,188 | 4/1979 | Nagai | 348/185 |
| 4,149,189 | 4/1979 | Nagai | 348/185 |
| 4,677,481 | 6/1987 | Nicholas | 348/185 |
| 4,953,017 | 8/1990 | Ivey et al. | 348/185 |
| 5,172,216 | 12/1992 | Suzuki et al. | 348/185 |
| 5,343,298 | 8/1994 | Larson et al. | 348/184 |

FOREIGN PATENT DOCUMENTS 2183420  3/1987  United Kingdom ........... H04N 17/02

OTHER PUBLICATIONS

K. Okada, Oscilloscopes, Kyoritsu Publishing Co., Apr. 15, 1983, 4.7.1 (pp. 119–121).

Primary Examiner—James J. Groody
Assistant Examiner—Glenton B. Burgess
Attorney, Agent, or Firm—Fish & Richardson

[57] ABSTRACT

An apparatus for displaying line and frame waveforms having different time-scales of a video signal on a display screen is described which comprises complex sweep signal generating means including a line sweep signal generating circuit 2, a frame sweep signal generating circuit 3 and a switching circuit 4, and horizontal axis drive circuit including a horizontal location arrangement circuit 5 and a horizontal axis drive circuit 6. The line and frame sweep signal generating circuits 2 and 3 generate line and frame sweep signals $S_2$ and $S_3$ synchronously with line and frame synchronization signals of the video signal, respectively, and the switching circuit 4 alternatively transfers the line and frame sweep signals $S_2$ and $S_3$, synchronously with the frame synchronization signal to generate a complex sweep signal $S_4$.

8 Claims, 3 Drawing Sheets

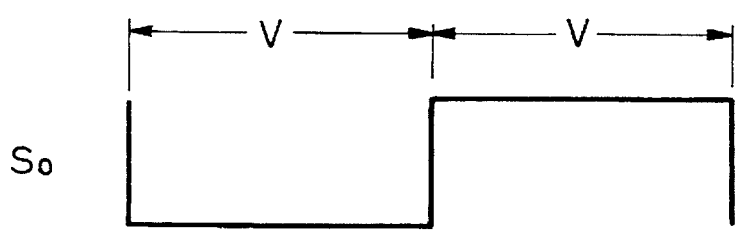
Fig. 3(A) S₀
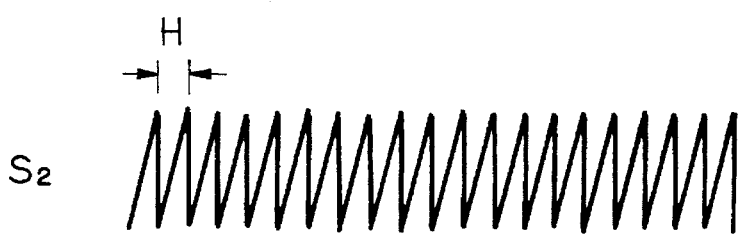
Fig. 3(B) S₂
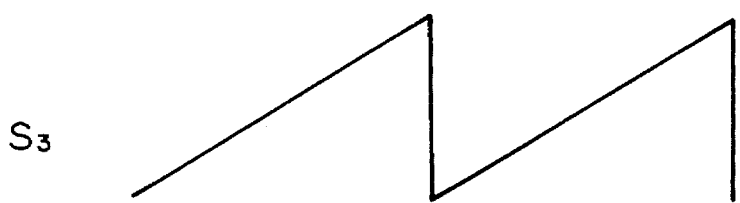
Fig. 3(C) S₃
Fig. 3(D) S₄
Fig. 3(E) S₅
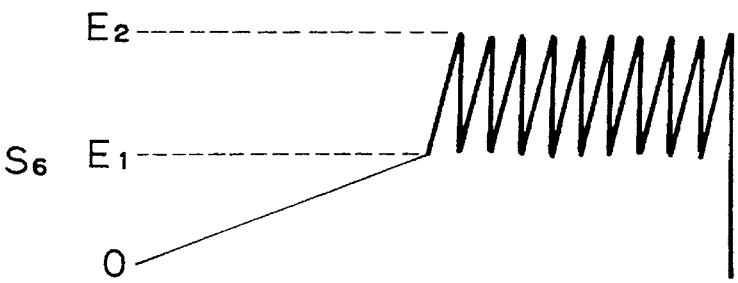
Fig. 3(F) S₆

APPARATUS AND METHOD FOR DISPLAYING DIFFERENT TIME-SCALE WAVEFORMS OF A SIGNAL

BACKGROUND OF THE INVENTION

1. Field of the Invention

This invention relates to an apparatus and a method for displaying waveforms of an input signal provided to a measuring device such as an oscilloscope. More particularly, the invention relates to an apparatus and a method capable of simultaneously displaying two different time-scale waveforms of an input video signal on the same screen.

2. Prior Art

In a conventional video signal display apparatus, two waveforms in different time-scales of a video signal are selectively switched to be displayed on a screen. For example, a waveform in a frame of a video signal (a frame waveform) is displayed as shown in FIG. 1(A) in a frame waveform display mode and a waveform in a horizontal line of the video signal (a line waveform) is displayed as shown in FIG. 1(B) in a line waveform display mode, thereby one of the frame and line waveforms is selected and displayed on the screen.

In the above prior apparatus, the display mode switching operation is necessary since it is impossible for two different time-scale waveforms such as the line waveform and frame waveform to be simultaneously displayed on the same screen. Moreover, whenever a display mode switching operation takes place, the operator has to remember the previously displayed waveform in order to compare the current and previous waveforms. Thus, if the operator has difficulty in remembering the previous waveform, he/she has to switch the displayed waveform to the previous one to confirm it. Therefore, the prior apparatus has the disadvantage where when two different time-scale waveforms should be compared the operation is complicated and the operator is required to remember the once displayed waveform.

In a conventional oscilloscope, a detailed portion of the entire waveform on the display can be enlarged to be displayed by adopting a delay sweep mode, thereby enabling the entire waveform and partial waveform to be displayed on the same screen, or alternatively, these waveforms are displayed on two divided portions of the screen. In case of the oscilloscope, it is possible to display two different time-scale waveforms on the same screen by employing the delay sweep mode. However, it is still necessary to perform a fast sweep operation so as to enlarge the detailed portion in the delay sweep mode. And if the fast sweep operation is conducted, the brightness of the screen decreases since the sweep time period is shortened.

SUMMARY OF THE INVENTION

Accordingly, the main purpose of the present invention is to provide an apparatus and method which are capable of overcoming the above mentioned problems and simultaneously displaying different time-scale waveforms of a signal, for instance a line waveform and frame waveform of a video signal, at the same display screen, while maintaining the brightness of the screen.

In order to achieve the above-mentioned purpose of the invention, an apparatus for displaying different time-scale waveforms of a video signal on a display screen according to the present invention comprises: (a) complex sweep signal generating means for generating a cyclic complex sweep signal, each cycle of which is two frame cycles of said video signal and has a first half sweep portion corresponding to a frame sweep signal generated synchronously with a frame synchronization signal of said video signal and a second half sweep portion corresponding to line sweep signals generated synchronously with line synchronization signals of said video signal; and (b) horizontal axis drive means for driving, in response to said complex sweep signal, a first portion of the horizontal axis of said display screen with either one of said first and second sweep portions of said complex sweep signal and the remaining second portion of said display screen with the other, thereby the frame waveform in a frame of said video signal and the line waveforms of horizontal lines in the frame of said video signal being simultaneously displayed on different first and second portions of the same display screen.

The complex sweep signal generating means is preferably constituted with (a1) a line sweep signal generating circuit for generating a line sweep signal synchronously with the line synchronization signal, (a2) a frame sweep signal generating circuit for generating a frame sweep signal synchronously with the frame synchronization signal, and (a3) a switching circuit for generating the complex sweep signal by alternatively transferring the line and frame sweep signals, synchronously the said frame synchronization signal.

The horizontal axis drive means is preferably constituted with (b1) a horizontal location arrangement circuit for generating a horizontal location arrangement signal alternatively varying between the zero level and a predetermined non-zero level synchronously with the frame synchronization signal to define a location at which the horizontal axis of the display screen is divided into the first and second portions, and (b2) a horizontal axis drive circuit in response to the complex signal and the horizontal location arrangement signal, for driving the horizontal axis with one of the first and second sweep portions of the complex sweep signal and with the other which has been level-shifted by the predetermined level.

Further, a method of displaying different time-scale waveforms of a video signal on a display screen according to the invention comprises the steps of (a) generating a cyclic complex sweep signal, each cycle of which is two frame cycles of the video signal and has a first half sweep portion corresponding to a frame sweep signal generated synchronously with a frame synchronization signal of the video signal and a second half sweep portion corresponding to line sweep signals generated synchronously with line synchronization signals of the video signal; (b) driving, in response to the complex sweep signal, a first portion of the horizontal axis of the display screen with either one of the first and second sweep portions of the complex sweep signal and the remaining second portion of the display screen with the other; and (c) simultaneously displaying a frame waveform of the video signal and line waveforms of the video signal in a horizontal line on different first and second portions of the same display screen.

The step of generating the complex sweep signal preferably comprises the steps of (a1) generating the line sweep signal synchronously with the line synchronization signal, (a2) generating the frame sweep signal synchronously with the frame synchronization signal, and (a3) generating the complex sweep signal by alternatively transferring the line and frame sweep signals, synchronously with the frame synchronization signal.

The step of driving the horizontal axis preferably comprises the steps of (b1) generating a horizontal location arrangement signal alternatively varying between the zero level and a predetermined non-zero level synchronously with the frame synchronization signal to define a location at which the horizontal axis of the display screen is divided into the first and second portions, and (b2) driving, in response to the complex signal and the horizontal location arrangement signal, the horizontal axis with one of the first and second sweep portions of the complex sweep signal and with the other which has been level-shifted by the predetermined level.

The invention allows the frame and line waveforms of a video signal to be simultaneously displayed on the same display, thereby enabling the relationship of the waveforms to be compared on a single display screen. Further, unlike a prior art oscilloscope that displays two waveforms separately by using delay sweep mode, the brightness of the screen does not decrease because the present invention neither uses the technique of enlarging the detailed portions on the time axis for display nor performs the fast sweep.

BRIEF DESCRIPTION OF THE DRAWINGS

The detailed description of embodiments will be better understood with reference to the attached drawings in which:

FIGS. 3(A)–3(F) show signal waveforms output from respective components of the embodiment shown in FIG. 2.

DETAILED DESCRIPTION OF PREFERRED EMBODIMENTS

Figure 2:
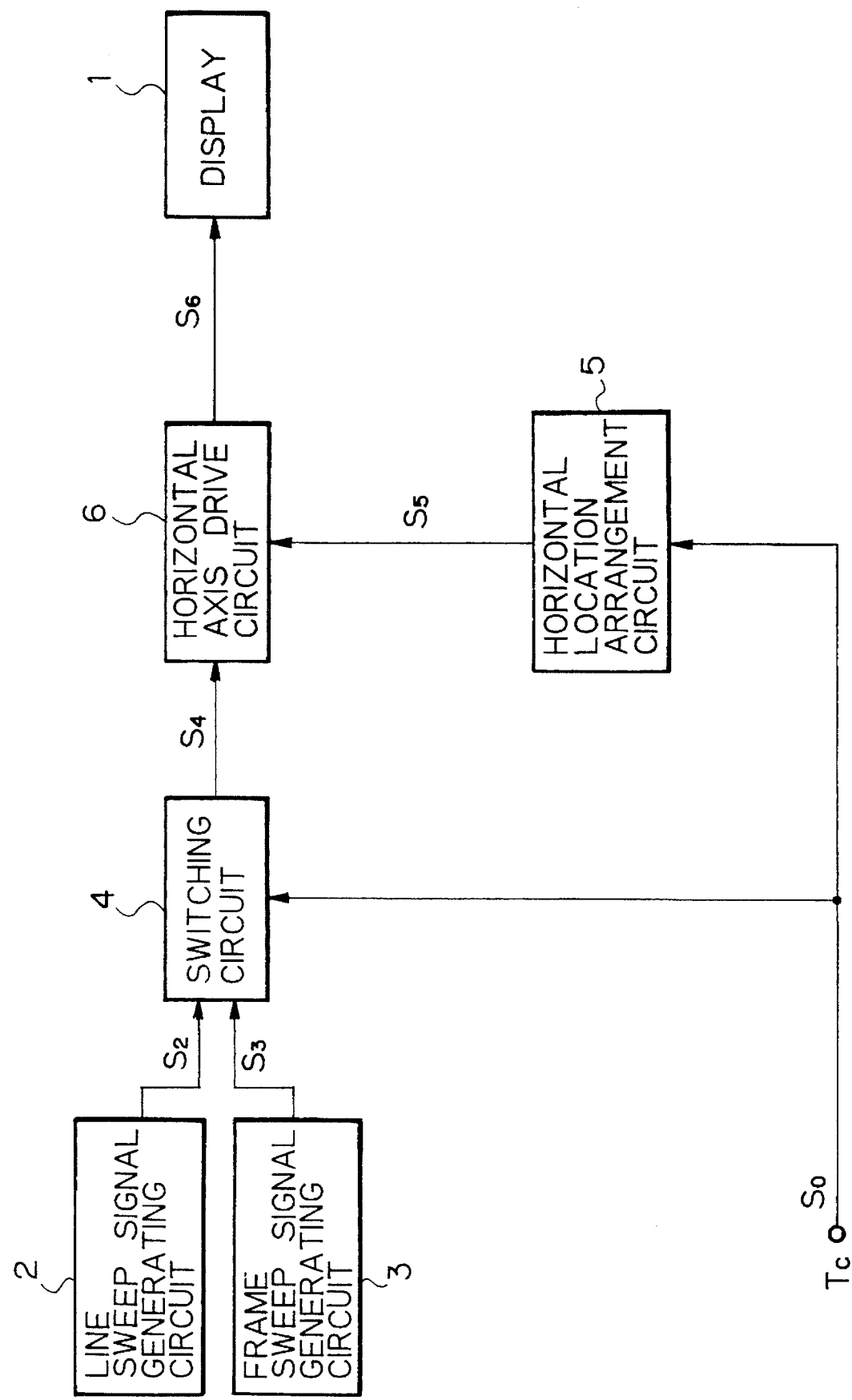
FIG. 2 schematically shows a block diagram of an embodiment of the present invention.

FIG. 2 shows an embodiment of an apparatus for displaying different time-scale waveforms of a signal in accordance with the present invention. In the drawing, the reference numeral 1 denotes a display such as a CRT display, 2 a line (or horizontal) sweep signal generating circuit, and 3 a frame (vertical) sweep signal generating circuit. The circuits 2 and 3 respectively generate line and frame sweep signals $S_2$ and $S_3$ synchronously with horizontal and vertical synchronization signals output from horizontal and vertical synchronization detecting circuits (not shown). The reference numeral 4 denotes a switching circuit for selectively transferring one of the line sweep signal $S_2$ and frame sweep signal $S_3$ as a sweep signal $S_4$ in response to a control signal $S_0$ provided to a control terminal $T_c$, 5 a horizontal location arrangement circuit responsive to the control signal $S_0$ for generating a horizontal location arrangement signal $S_5$ which is used for setting horizontal reference or initial display locations of respective waveforms on the screen of the display 1, and 6 a horizontal axis drive circuit 6 responsive to the signals $S_4$ and $S_5$ for generating a horizontal axis drive signal $S_6$ which is used for driving the horizontal axis of the display 1.

A circuit for driving the vertical axis of the display 1 in response to signal levels is of the conventional configuration, thus is not shown in FIG. 2.

The detailed operation of the apparatus is hereunder described in referring to timing waveform diagram shown in FIGS. 3(A)–3(F).

In a complex display mode wherein the frame and line waveform are displayed on the same display screen, the control signal $S_0$ supplied to the control terminal $T_c$ has low and high levels alternately inverted for a frame time period V synchronously with a frame synchronization signal of a video signal to be displayed on the display, as shown in FIG. 3(A), thereby having the cycle of 2V. When the control signal $S_0$ is in the low level, the switching circuit 4 transfers the line sweep signal $S_2$ as shown in FIG. 3(B) from the line sweep signal generating circuit 2, and when it is in the high level, the circuit 4 transfers the frame sweep signal $S_3$ as shown in FIG. 3(C) from the frame sweep signal generating circuit 3. Accordingly, the sweep signal $S_4$ as shown in FIG. 3(D) is output from the switching circuit 4. Therefore, the sweep signal $S_4$ also has the cycle of 2V.

The control signal $S_0$ is also applied to the horizontal location arrangement circuit 5 and controls the level of horizontal location arrangement signal $S_5$ from the circuit 5 such that when the control signal $S_0$ is in the low level, the level of the signal $S_5$ is at zero voltage, and when the control signal $S_0$ is in the high level, the signal $S_5$ is a predetermined high voltage $E_1$. The generated horizontal location arrangement signal $S_5$ is shown in FIG. 3(E).

The generated sweep signal $S_4$ and horizontal location arrangement signal $S_5$ are then provided to the horizontal axis drive circuit 6, where the horizontal axis drive signal $S_6$ is generated on the basis of the signals $S_4$ and $S_5$. The horizontal axis drive circuit 6 combines the signals $S_4$ and $S_5$ to generate the signal $S_6$ such that the signal $S_6$ becomes a signal corresponding to the frame sweep signal $S_3$ during which the signal $S_5$ is zero and corresponding to the line sweep signal which has been level-shifted by the voltage of $E_1$ during which the signal $S_5$ is the level of $E_1$, as shown in FIG. 3(F). In other words, during the first half of the cycle 2V, the signal $S_6$ linearly varies from zero to $E_1$ and is capable of sweeping or driving the horizontal axis up to a location thereof associated with $E_1$, while during the second half of the cycle, it linearly varies from $E_1$ to $E_2$ for each of the line cycles of H and is capable of sweeping or driving the horizontal axis from the location to the end thereof. Depending on the level of $E_1$, the location that divides the left and right portions of the horizontal axis can be defined. For example, if it is defined so as to fulfill the relationship of $E_1=E_2/2$, then the first and second portions are set to be a half each.

The horizontal axis is driven by the horizontal axis drive signal $S_6$ generated as described above. Since the first half cycle of the signal $S_6$ is identical with the frame cycle V, the video signal in the entire frame, the frame video signal, is applied to a circuit for driving the vertical axis of the display screen during the first half. Accordingly, on the left half of the display screen, the frame waveform of the video signal is displayed. On the other hand, since each of the horizontal line signals is supplied to the vertical axis driving circuit for the corresponding line cycle H during the second half cycle of the signal $S_6$, one of the line waveforms of the video signal is successively displayed on the right side of the display screen. Two different time-scale waveforms, the frame and line waveforms, thus can be displayed on the screen of the display 1 as shown in FIG. 3.

Figure 1A:
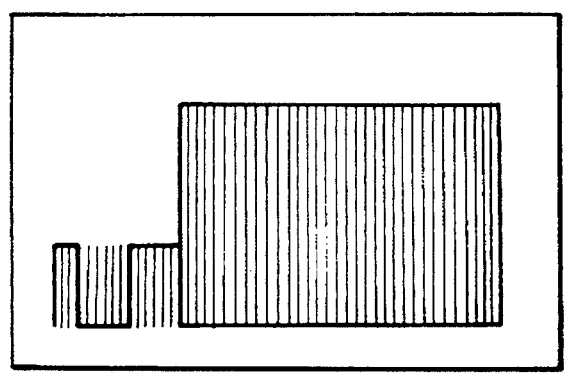
FIGS. 1(A) and 1(B) are schematic illustrations of frame waveform and line waveform of a video signal respectively displayed on a screen in accordance with a prior art apparatus.

In a frame waveform display mode, the control signal $S_0$ supplied to the terminal $T_c$ is set to keep the low level, and thus the switching circuit 4 transfers only the frame sweep signal $S_3$ from the circuit 3 to the horizontal axis drive circuit 6. That is, the signals $S_3$ and $S_4$ are the same. In this mode, the horizontal location arrangement circuit 5 is set to generate the signal $S_5$ keeping zero level. Accordingly, the horizontal axis drive signal $S_6$ generated from the circuit 6 is similar to the frame sweep signal $S_3$, thereby only the frame waveform is displayed on the whole display screen, as shown in FIG. 1(A).

Figure 1B:
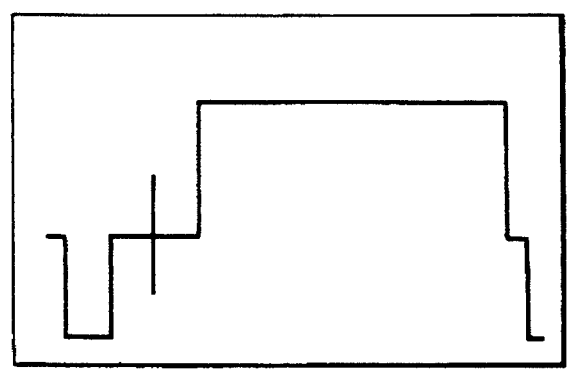
Figure 4:
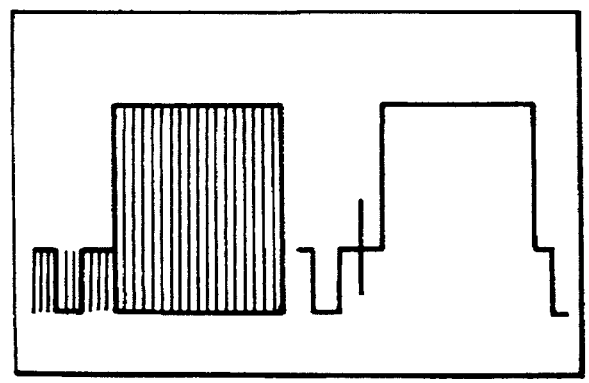
FIG. 4 is a schematic illustration of frame and line waveforms of a video signal displayed on the same screen in accordance with the present invention.

In a line waveform display mode, the control signal $S_0$ is set to maintain the high level and thus the switching circuit 4 transfers only the line sweep signal $S_2$ from the circuit 2 to the horizontal axis drive circuit 6. That is, the signal $S_4$ is the signal $S_2$. In this mode, the horizontal location arrangement circuit 5 is set to generate the signal $S_5$ keeping the zero level. Accordingly, the horizontal axis drive signal $S_6$ generated from the circuit 6 is similar to the line sweep signal $S_2$, thereby the line waveforms are successively displayed on the whole display screen, as shown in FIG. 1(B).

In the above embodiment, although the frame waveform is displayed on the left side and the line waveform on the right side in the complex display mode, this allocation can be reversed by making opposite the switching timing of switching circuit 4. Further, in the first half of the cycle 2V, it is possible for the signal $S_6$ to vary from zero to a level less than $E_1$, thereby providing no waveform portion between left and right portion on the display screen.

Also, instead of separately comprising the line and frame sweep signal generating circuits 2 and 3 and the switching circuit 4, a triangular wave generating circuit having its frequency variably controlled can be employed to generate the complex sweep signal $S_5$ by controlling and varying the oscillation frequency of an output saw-toothed signal in response to a selected display mode.

Further, the horizontal location arrangement circuit 5 can be located after the line sweep signal generating circuit 2 or frame sweep signal generating circuit 3, according to which waveform should be displayed in the right or the left portion of the display screen. Furthermore, if necessary, a line selecting circuit for selecting one of the line signals to be displayed can be additionally inserted at a suitable portion, for example after a vertical axis drive circuit (not shown).

While the invention has been described in connection with what is presently considered to be the most practical and preferred embodiments, it should be understood that the invention is not to be limited to the herein disclosed embodiment, but on the contrary, is intended to cover various modifications and equivalent arrangements included within the spirit and scope of the appended claims.

What is claimed is:

1. An apparatus for displaying different time-scale waveforms of a video signal on a display screen comprising:

complex sweep signal generating means for generating a cyclic complex sweep signal, each cycle of which is two frame cycles of said video signal and has a first half sweep portion corresponding to a frame sweep signal generated synchronously with a frame synchronization signal of said video signal and a second half sweep portion corresponding to line sweep signals generated synchronously with line synchronization signals of said video signal; and horizontal axis drive means for driving, in response to said complex sweep signal, a first portion of the horizontal axis of said display screen with either one of said first and second sweep portions of said complex sweep signal and the remaining second portion with the other, thereby a frame waveform of said video signal and one of line waveforms of horizontal lines being displayed on different first and second portions of the same display screen.

2. An apparatus according to claim 1, wherein said complex sweep signal generating means comprises:

a line sweep signal generating circuit for generating said line sweep signal synchronously with said line synchronization signal;

a frame sweep signal generating circuit for generating said frame sweep signal synchronously with said frame synchronization signal; and a switching circuit for generating said complex sweep signal by alternatively transferring said line and frame sweep signals, synchronously with said frame synchronization signal.

3. An apparatus according to claim 1 or 2, wherein said horizontal axis drive means comprises:

a horizontal location arrangement circuit for generating a horizontal location arrangement signal alternatively varying between a zero level and a predetermined non-zero level synchronously with said frame synchronization signal to define a location at which said horizontal axis of the display screen is divided into said first and second portions; and a horizontal axis drive circuit responsive to said complex signal and said horizontal location arrangement signal, for driving said horizontal axis with one of said first and second sweep portions of said complex sweep signal and with the other which has been level-shifted by said predetermined level.

4. An apparatus according to claim 3, wherein said apparatus further displays only one of said frame and line waveforms on said display screen, by controlling said complex sweep signal generating means to output only one of frame and horizontal sweep signals and said horizontal location arrangement means to output only said zero level in a frame or line waveform display mode.

5. A method of displaying different time-scale waveforms of a video signal on a display screen comprising the steps of:

generating a cyclic complex sweep signal, each cycle of which is two frame cycles of said video signal and has a first half sweep portion corresponding to a frame sweep signal generated synchronously with a frame synchronization signal of said video signal and a second half sweep portion corresponding to line sweep signals generated synchronously with line synchronization signals of said video signal; and driving, in response to said complex sweep signal, a first portion of the horizontal axis of said display screen with either one of said first and second sweep portions of said complex sweep signal and the remaining second portion with the other;

simultaneously displaying a frame waveform of said video signal and line waveforms of said video signal in a horizontal line on different first and second portions of the same display screen.

6. A method according to claim 5, wherein the step of generating said complex sweep signal comprises the steps of:

generating said line sweep signal synchronously with said line synchronization signal;

generating said frame sweep signal synchronously with said frame synchronization signal; and generating said complex sweep signal by alternatively transferring said line and frame sweep signals, synchronously with said frame synchronization signal.

7. A method according to claim 5 or 6, wherein the step of driving said horizontal axis comprises the steps of:

generating a horizontal location arrangement signal alternatively varying between a zero level and a predetermined non-zero level synchronously with said frame synchronization signal to define a location at which said horizontal axis of the display screen is divided into said first and second portions;

driving, in response to said complex signal and said horizontal location arrangement signal, said horizontal axis with one of said first and second sweep portions of said complex sweep signal and with the other which has been level-shifted by said predetermined level.

8. A method according to claim 7, further comprising the steps of:

generating only one of frame and line sweep signals as said complex sweep signal;

generating said horizontal location arrangement signal at only the zero level; and displaying only one of said frame and line waveforms on said display screen.

* * * * *